Feb. 13, 1934.  J. C. FONDA  1,947,290
SOUND RECORDING ON MOTION PICTURE FILM
Filed Oct. 27, 1930   2 Sheets-Sheet 1
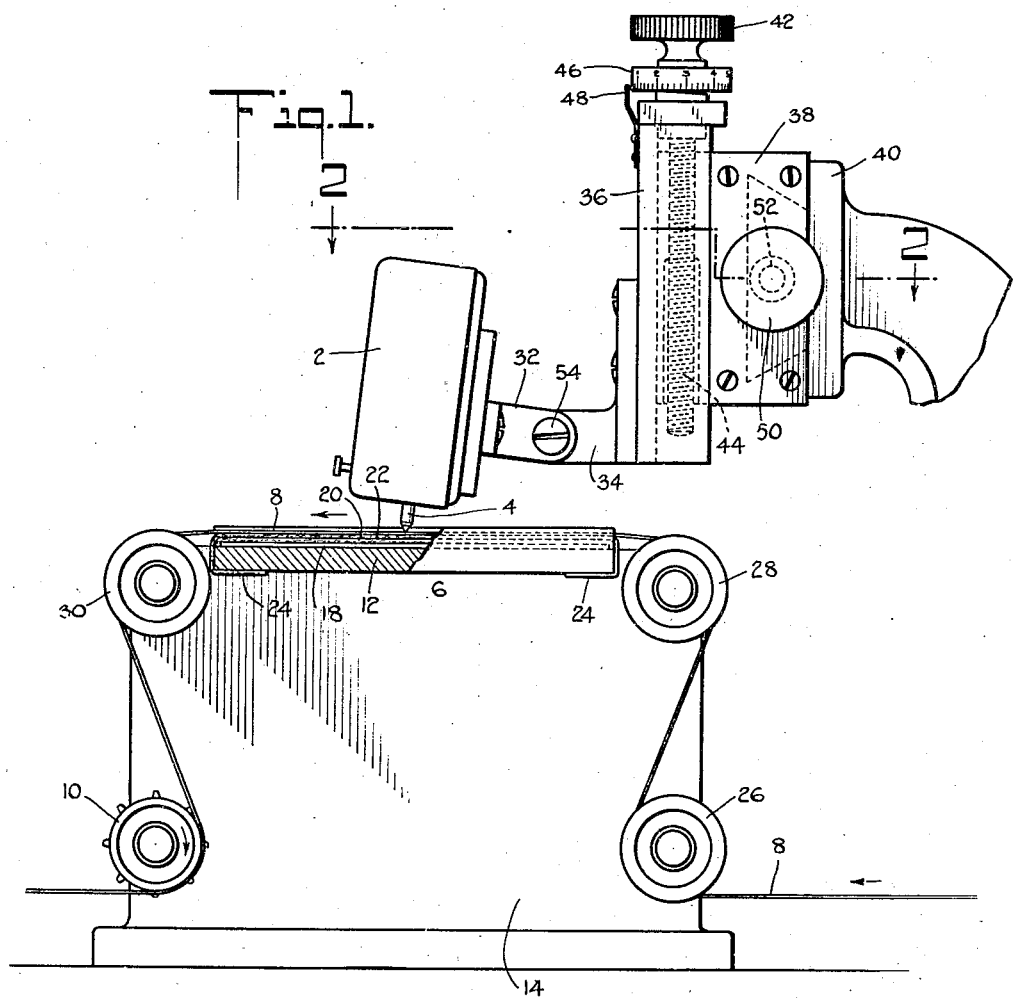
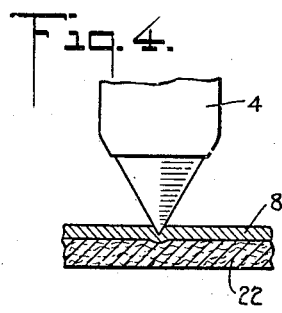
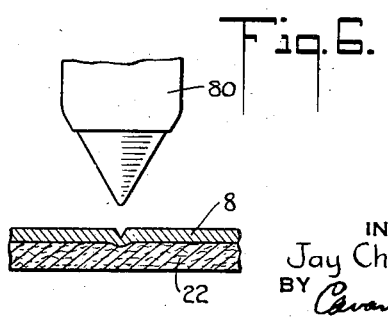
INVENTOR
Jay Charles Fonda
BY
ATTORNEYS Feb. 13, 1934. J. C. FONDA 1,947,290
SOUND RECORDING ON MOTION PICTURE FILM
Filed Oct. 27, 1930 2 Sheets-Sheet 2
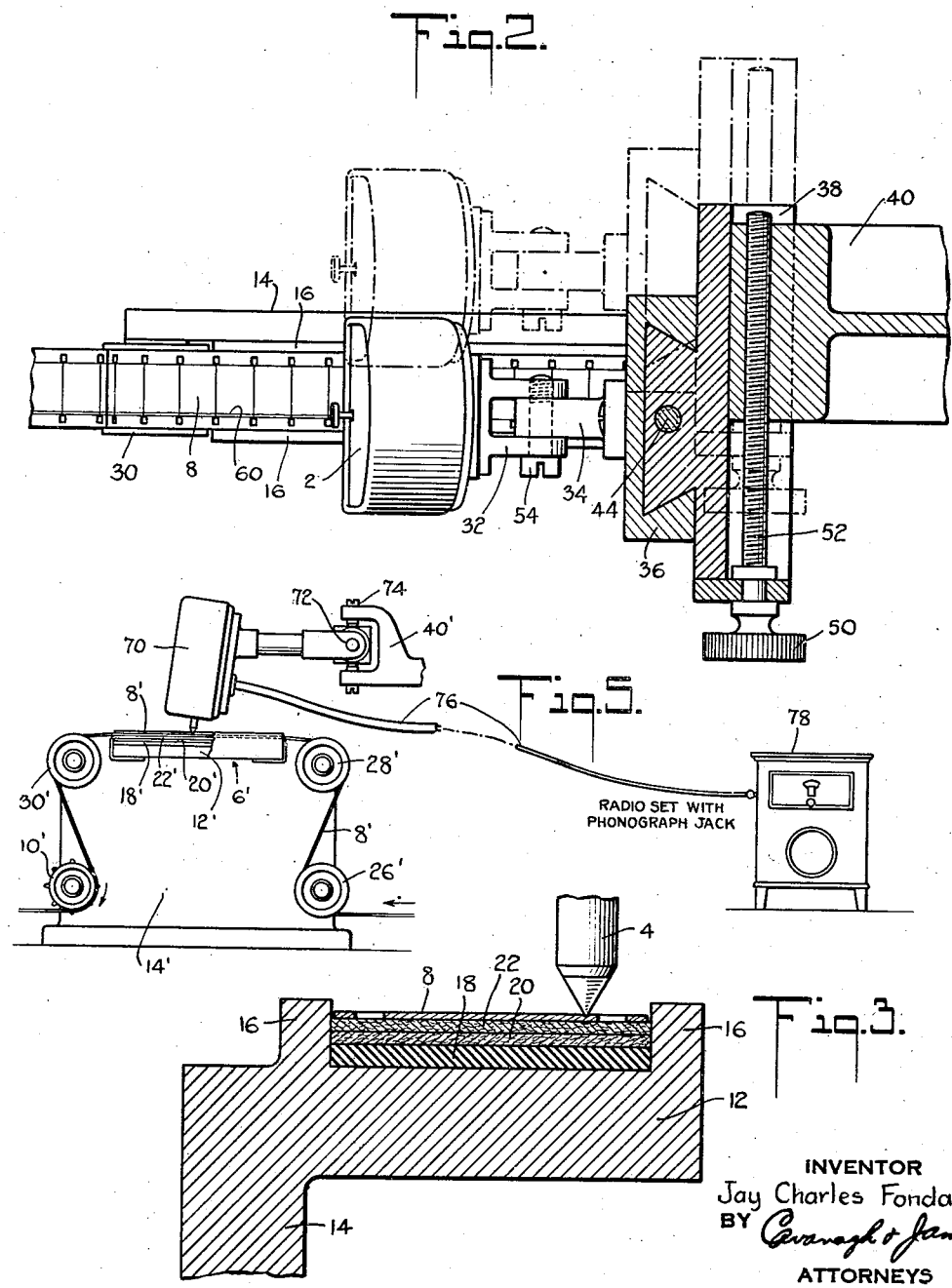
INVENTOR
Jay Charles Fonda
BY
ATTORNEYS Patented Feb. 13, 1934

1,947,290

UNITED STATES PATENT OFFICE 1,947,290

SOUND RECORDING ON MOTION PICTURE FILM

Jay Charles Fonda, Sheepshead Bay, N. Y., assignor of one-half to Fred T. Roberts, New York, N. Y.

Application October 27, 1930. Serial No. 491,436

3 Claims. (Cl. 274—11)

This invention relates to sound recording on motion picture film, and more particularly to a method and means for recording and reproducing synchronized sound and picture effects by means of a sound groove formed directly in motion picture film.

It has heretofore been suggested to record sound on motion picture film by forming a sound groove in the film, but, so far as I am aware, no such scheme has heretofore proved practicable and commercially successful. Attempts to heat the stylus during the recording operation involve undue complexity in apparatus and introduce film shrinkage difficulties. Recording in the cold state by means of a relatively blunt stylus arranged at a long slope or acute angle relatively to the film has also been suggested, but such an arrangement does not permit of the recording of sound over a desirably wide range of frequency, for the upper frequency limit is quite low unless the film is run at excessive speed. This difficulty is particularly marked when dealing with 16 millimeter film such as is used for amateur and home motion pictures. This small film is economical not only because of its reduced width and thickness but also and more importantly because of the reduced length of film needed. To project 16 pictures per second the standard 35 millimeter film is run at 60 feet a minute, whereas the 16 millimeter film is run at only 24 feet per minute. When it is remembered that the desirable sound frequency range should run up to at least 3000 cycles per second and preferably more, the impossibility of recording such frequencies on 16 millimeter film becomes apparent.

The primary object of my invention is to improve the recording of a sound groove in motion picture film by means of a cold stylus with a view to improving the quality of the recording and extending the upper frequency limit obtainable. I have empirically found that the desired object may be fulfilled by running the film over a yieldable or resilient backing or bed during the recording operation. One or more layers of felt or similar material may be employed over which the film is readily passed without undue friction. A lamination of rubber may be placed beneath the felt for the sake of its absorption property and this, while not essential, seems to free the recording from noise or scratch frequencies. The theory on which the value of such a yieldable bed functions is rather uncertain and obscure and probably involves a number of factors such as the tendency of the film to hug the sides of the stylus, the ability of the film to yield downwardly away from the stylus during the recording of high frequencies, thereby permitting the stylus to vibrate more freely, and the tendency of the film to stick with the material of the bed enough to discourage a lateral vibration of the film with the stylus.

The yieldable bed which is provided in accordance with the present invention is of extreme value for another reason, namely, that it permits the use of a sharp and a substantially vertical stylus, such as a sharply pointed diamond, without scratching the film in a rough manner, without weakening the film excessively, and without producing a groove which is clearly visible when the film is projected. The use of such a stylus further improves the width of frequency range obtainable, for a sharply pointed nearly vertical stylus is obviously capable of recording a higher frequency than a blunt sloping stylus, for any given film speed.

Another object of the present invention is to obtain a substantial depth of recording groove which makes it possible for a stylus to readily follow the groove when reproducing the sound, and which further makes it possible to obtain sufficient power or pick-up volume so that the pick-up, which ordinarily will be amplified electrically, may be sufficiently amplified in the audio frequency amplifier of a radio receiver as, for example, by plugging into the phonograph jack now commonly provided in such receivers.

The sound is recorded by a side to side rather than a hill and dale vibration, particularly in view of the thinness of the film. A further object of the present invention is to avoid the production of noise due to residual or unintentional hill and dale effect at the bottom of a side to side groove. This object is fulfilled by using a reproducing stylus less sharp than the recording stylus so that the tip of the reproducing stylus rests upon the sides of the sound groove and does not reach the very bottom of the sound groove, which makes it substantially non-responsive to hill and dale effect.

Still another object of the present invention is to insure reproduction of the full frequency range recorded on the film, and to this end I have found it desirable to run the film between the reproducing stylus and a yieldable bed, which may be constructed exactly like that previously described for use when recording on the film. Such a backing for the film seems to cause the sides of the sound track to hug the stylus and thereby increases the fidelity of the reproduction.

Many pictures for home use are reproductions on 16 millimeter film of commercial pictures originally made on 35 millimeter film. In commercial work it has been found impracticable to obtain good photo recording when running the film at 60 feet a minute corresponding to the projection of 16 pictures per second, and it is therefore customary to run the film at 90 feet per minute corresponding to the projection of 24 pictures per second. In accordance with another object of the present invention, inter-transposition of talking pictures on 35 and 16 millimeter film is facilitated by running the 16 millimeter film at a speed of 36 feet per minute corresponding to the projection of 24 pictures per second, that is, the 16 millimeter and 35 millimeter films are run in one for one picture frame synchronization. This increases the frequency range recordable on the 16 millimeter film, and when taken together with the factors previously outlined, such as the use of a yieldable bed in cooperation with a sharply pointed nearly vertical stylus, results in an entirely satisfactory frequency range. The 36 feet per minute speed here employed should be considered in contrast with a speed such as 60 feet per minute which, so far as I am aware, is the lowest speed on which sound has been successfully recorded on 16 millim. ;er film. The latter speed of course is prohibitive, for it makes the 16 millimeter film cost nearly as great as that of the 35 millimeter film.

To the accomplishment of the foregoing and such other objects as will hereinafter appear, my invention consists in the recording and reproducing method and apparatus elements and their relation one to the other, as hereinafter are more particularly described in the specification and sought to be defined in the claims. The specification is accompanied by drawings in which:

Fig. 1 is a side elevation of the recording apparatus;

Fig. 2 is a plan view of the same;

Fig. 3 is an enlarged section taken through the yieldable bed on which the film is run;

Fig. 4 is a detail explanatory of the recording operation;

Fig. 5 is a schematic showing of the reproducing apparatus; and

Fig. 6 is a detail explanatory of the reproducing operation.

Referring to the drawings, and more particularly to Figs. 1 and 2, the recording apparatus comprises a recording unit 2, preferably of the electromagnetic type, and carrying a stylus 4. The recording unit is mounted opposite a yieldable bed generally designated 6, over which the film 8 is drawn by means of a sprocket 10 which is rotated at a uniform speed by any suitable source of power.

The bed 6 includes a metallic base 12 which is formed integrally with a rigid upright pedestal 14. As is most clearly shown in Fig. 3, this base includes marginal or guide walls 16 the distance between which is accurately gaged to receive the film 8. In the resulting recess there are placed superimposed plies of rubber and felt. More specifically, there is a lamination 18 of rubber and a pair of layers 20 and 22 of felt. The layer 22 may be extended around the ends of base plate 12 and cemented thereto, as is indicated at 24 in Fig. 1, thereby holding the subjacent laminations in place.

Felt seems to be a particularly successful material for this purpose because it permits the film to pass without undue friction and is sufficiently but not excessively resilient. Rubber is not satisfactory for use in direct contact with the film and is not essential in the arrangement disclosed, but is desirable because it possesses a damping or absorption property which seems to purify and eliminate noise from the sound subsequently obtained.

The pedestal 14 has mounted thereon guide pulleys 26, 28 and 30 which guide the film over the bed 6 and which keep the film in contact with a large portion of the circumference of sprocket wheel 10, thereby insuring accurate and uniform movement of the film.

The reproducer 2 is rigidly mounted by means of a yoke 32 and arm 34 on a vertically reciprocable member 36 which is dovetailed to a horizontally reciprocable member 38, which is in turn mounted upon and dovetailed to a stationary bracket 40. This arrangement permits of universal adjustment of stylus 4 in both the vertical direction, which controls the depth of sound groove produced, and the horizontal direction, which controls the location of the sound groove relative to the picture frames and sprocket holes on the film. The vertical reciprocation is accomplished by a knob 42 on a micrometer screw 44, and quantitative observation of the adjustment is provided for by means of a scale 46 cooperating with a pointer 48. As is evident from Fig. 4, the groove is preferably formed to a depth equivalent to about half the thickness of the film, which thickness, in the case of 16 millimeter film, is only of the order of six thousandths of an inch, and it is for this reason that accurate micrometric control of the stylus position is necessary.

The lateral movement of the recorder is obtained by rotation of a knob 50 on screw 52, and this adjustment is preferably employed to position the stylus within but closely adjacent to the sprocket holes on the film, as is indicated by the sound track 60 in Fig. 2.

The recording stylus 4 may, because of the resilient nature of the bed 6, be sharply pointed, and this is preferably done for two reasons, first, that it increases the frequency range recordable and, second, that it makes possible improved sound reproduction by using a more rounded stylus for reproduction. The yieldable bed 6 also makes it possible to mount the stylus 4 in a nearly upright position, and this is desirable for the same reasons as were advanced in favor of the use of a pointed stylus, for any inclination of the stylus away from the vertical is equivalent to the use of a less pointed stylus. This inclination of the recording stylus may be adjusted by moving the entire recording unit 2 bodily about the fastening screw 54, but it will be understood once the angle has been selected the screw 54 is tightly fastened in order to lock the reproducer against subsequent movement.

The recording stylus preferably consists of a sharply pointed diamond embedded and anchored in a metallic holder in a manner well understood in the art.

The reproducing apparatus (Fig. 5) may comprise a pedestal 14' bearing guide pulleys 26', 28' and 30' and a driving sprocket 10', just as was the case in the recording apparatus. The pedestal 14' may further be provided with a bed 6' including a metallic plate 12' and superimposed laminations of rubber and felt 18', 20' and 22' over which the film 8 is drawn by the sprocket 10'. A bracket 40' carries a reproducer, preferably in the form of an electrical pick-up 70, but the latter is mounted on the bracket 40' for universal movement by means of horizontal and vertical pivots 72 and 74. The electrical energy obtained from pick-up 70 may be fed by means of flexible lead wires 76 to any suitable audio frequency amplifier similar to that used in a radio receiver, indicated at 78, or the audio frequency amplifier and loud speaker of a radio receiver may themselves be used for this purpose, particularly if fitted with a phonograph jack as is now frequently the case.

The reproducing stylus 80 is preferably made rather rounded or blunt relative to the recording stylus, as is most clearly shown in Fig. 6. This precaution is not essential but results in better quality of reproduction, for a reproducing stylus which is less sharp than the recording stylus rests upon the sides of the sound groove and does not reach the very bottom of the sound groove and therefore avoids most, if not all, of the noise which may be produced by hill and dale effect in the bottom of the sound groove. A specific stylus which I have found valuable is a very slightly blunted sapphire.

It should also be understood that the use of a yieldable bed during the reproducing operation is not essential, but it is desirable because it helps avoid noise and more importantly because it enhances fidelity by tending to urge the sides of the sound groove around the tip of the stylus.

The manner in which my invention may be employed in practice will vary according to the particular circumstances encountered. For example, if the picture is merely to be provided with sound or musical effects in contradistinction to synchronized speech, the sound may simply be added to a positive film which has already been printed. This sound may be obtained from an original source or from a phonograph or photographic record. If synchronized speech is wanted for pictures which are reproduced or transposed from 35 millimeter to 16 millimeter film, the sound track may be added to a previously printed positive film in the manner above described, or it may be added to the film in the dark while exposing the film to the negative. The sound record will, of course, be obtained from either phonographic or photographic recording, depending upon which was employed in connection with the original 35 millimeter film.

For original talking pictures the sound track may be impressed in the dark on a reversible film while exposing the same to the object being photographed. After the film has been changed as a positive it will have provided therein the desired original sound groove. This makes amateur home talking pictures practicable, because only a single length of the regulation 16 millimeter reversible film, such as is now anyway used by amateurs, is needed for the talking picture. Original talking pictures may also be made by taking the synchronized sound on a phonographic or photographic or grooved film record separate from but synchronized with the negative film being exposed, and subsequently reproducing the sound in groove form on a previously printed or a simultaneously exposed positive film being printed from the originally exposed negative film.

By means of the present invention the sound record may be made on either the emulsion or the celluloid side of the film, and if made on the emulsion side of the film the emulsion may, if desired, be subsequently hardened to prolong the wear of the sound track. In the ordinary case it is probably simpler to place the sound track on the base or celluloid side of the film.

The method of recording and reproducing sound on motion picture film, the apparatus therefor, and the many advantages thereof will, it is thought, be apparent from the foregoing detailed description thereof. The frequency range and fidelity obtainable are so greatly increased that sound may be successfully recorded on even 16 millimeter film while using a film speed equivalent to the projection of only 24 pictures per second. A relatively deep and sharply defined sound track is obtainable without excessively weakening the film or making the same conspicuous during projection, and this makes it possible to amplify the pick-up energy in an ordinary radio receiver. Fidelity and purity are increased in the reproducing process as well as in the recording process by the use of a yieldable bed for keeping the film in close engagement with the stylus, and, if desired, a reproducing stylus which is less sharp than the recording stylus may be used to avoid hill and dale noises.

It will be apparent that while I have shown and described my invention in the preferred form, many changes and modifications may be made in the structure disclosed without departing from the spirit of the invention, defined in the following claims.

I claim:

1. Apparatus for recording or reproducing sound on motion picture film by means of a stylus comprising a stationary yieldable bed made of soft and resilient material of little frictional resistance to the passage of film thereover, a stylus, means for mounting the stylus opposite the bed, and means to move the film between the bed and stylus.

2. Apparatus for recording or reproducing sound on motion picture film by means of a stylus comprising a stationary yieldable bed including a soft rubber ply and a superimposed felt ply, a stylus, means for mounting the stylus opposite the bed, and means to move the film between the bed and the stylus.

3. Apparatus for recording sound on motion picture film comprising a stationary yieldable bed made of soft and resilient material, a recorder unit provided with a sharply pointed stylus, and means to move the film between the bed and stylus.

JAY CHARLES FONDA.